US012730693B2

(12) United States Patent
Xie et al.

(10) Patent No.: US 12,730,693 B2
(45) Date of Patent: Sep. 8, 2026

(54) COMMUNICATION METHOD AND APPARATUS FOR DUAL CPUS IN POS MACHINE, SYSTEM AND MEDIUM

(71) Applicant: PAX COMPUTER TECHNOLOGY (SHENZHEN) CO., LTD., Shenzhen (CN)

(72) Inventors: Lihong Xie, Shenzhen (CN); Ling Li, Shenzhen (CN)

(73) Assignee: PAX COMPUTER TECHNOLOGY (SHENZHEN) CO., LTD., Shenzhen (CN)

( * ) Notice: Subject to any disclaimer, the term of this patent is extended or adjusted under 35 U.S.C. 154(b) by 43 days.

(21) Appl. No.: 19/106,703

(22) PCT Filed: Jul. 27, 2023

(86) PCT No.: PCT/CN2023/109680
§ 371 (c)(1),
(2) Date: Feb. 26, 2025

(87) PCT Pub. No.: WO2024/041304
PCT Pub. Date: Feb. 29, 2024

(65) Prior Publication Data

US 2026/0064499 A1 Mar. 5, 2026

(30) Foreign Application Priority Data

Aug. 26, 2022 (CN) ........................ 202211030622.X

(51) Int. Cl.
*G06F 9/54* (2006.01)
*G06Q 20/20* (2012.01)
*G06Q 20/38* (2012.01)

(52) U.S. Cl.
CPC .............. *G06F 9/544* (2013.01); *G06F 9/546* (2013.01); *G06Q 20/20* (2013.01); *G06Q 20/382* (2013.01)

(58) Field of Classification Search
CPC ........ G06F 9/544; G06F 9/546; G06F 15/167; G06F 15/17306; G06Q 20/20; G06Q 20/382; G06Q 20/202; G07G 1/0009; G07G 1/12
See application file for complete search history.

(56) References Cited

U.S. PATENT DOCUMENTS

2024/0311785 A1* 9/2024 Komiyama .......... G07G 1/0036
2026/0012794 A1* 1/2026 Zhang .................. H04W 12/30

* cited by examiner

*Primary Examiner* — Garcia Ade
(74) *Attorney, Agent, or Firm* — ScienBiziP, P.C.

(57) ABSTRACT

The present application belongs to the technical field of POS machines, and particularly relates to a communication method for dual CPUs in a POS machine, a system and a medium. The communication method comprises: a security CPU receives a target service calling request initiated by a general CPU; the security CPU controls, according to the target service calling request, a client of a remote file system to initiate to a server of the remote file system a target service execution request, so that after receiving the target service execution request, the server of the remote file system can execute a target service on a storage module of the general CPU side, and send the execution result to the client of the remote file system; and the security CPU returns the execution result received by the client of the remote file system to the general CPU.

15 Claims, 4 Drawing Sheets

Start

Start mounting the file system

Does the interface exist

No

Yes

Mounting the file system

Return the execution result

End

COMMUNICATION METHOD AND APPARATUS FOR DUAL CPUS IN POS MACHINE, SYSTEM AND MEDIUM

The present application claims the priority of the Chinese invention patent application with the invention name "communication method and apparatus for dual CPUs in a POS machine, system and medium" submitted to the China Patent Office on Aug. 26, 2022, Application No. 202211030622.X, and the whole content of which is hereby incorporated by reference.

FIELD

The present application relates to the field of POS machines, and particularly relates to communication method and apparatus for dual CPUs in a POS machine, system and medium.

BACKGROUND

POS machines from the initial single CPU architecture slowly evolved into the use of more and more dual CPU architecture, the dual CPU architecture includes a general CPU and a security CPU, the two CPUs are independent of each other, running their own systems, the need for dual CPUs collaboration between each other in order to complete the specific functions of the POS machine, which involves the communication interaction of the dual CPUs. The traditional communication technology between the general CPU and the security CPU mainly adopts the serial communication of the UART protocol, this serial communication method has slow speed and low data exchange efficiency; furthermore, the traditional general CPU side and the security CPU side have storage modules (flash storage) that provide data access and storage space, resulting in a corresponding increase in the cost of the dual CPUs.

BRIEF DESCRIPTION OF THE DRAWINGS

In order to more clearly illustrate the technical solutions in the embodiments of the present application, the following will be a brief introduction to the embodiments or prior art description of the need to use the accompanying drawings, it is obvious that the following description of the accompanying drawings is only some of the embodiments of the present application, for ordinary technical personnel in this field, other drawings may be obtained based on these drawings without requiring creative labor.

DETAILED DESCRIPTION

In the following description, for the purpose of explanation rather than limitation, specific details such as particular system structures and technologies are provided to provide a thorough understanding of the embodiments of the present application. However, it should be clear to those skilled in the art that the present application may be implemented in other embodiments without these specific details. In other cases, detailed descriptions of well-known systems, devices, circuits, and methods are omitted so as not to obscure the description of the present application with unnecessary detail.

In order to illustrate the technical solutions described in the present application, specific embodiments are provided below.

Point of sale (POS) generally uses a non-security system. In order to meet the security requirements of the payment industry, the current solution is to add a security CPU to ensure the security of important data, the general CPU in a POS machine runs the core system, and the security CPU runs payment related services such as card processing, PIN processing, and key management. Because the general CPU and the security CPU run independently, they must collaborate with each other to complete the specific functions of the POS machine, which involves the communication between the general CPU and the security CPU, so how to ensure safe and stable communication between the general CPU and the security CPU has become a key technology of the intelligent POS.

Figure 1:
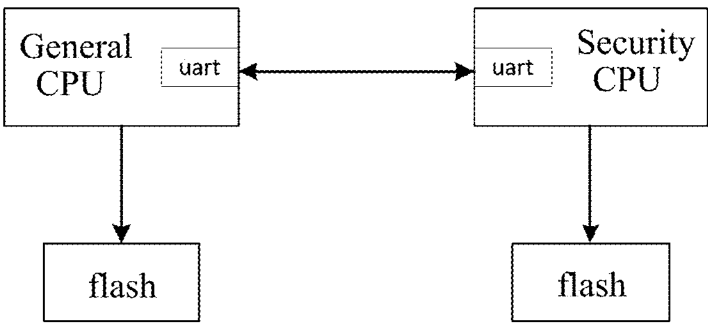
FIG. 1 is a schematic diagram of an existing dual CPU communication architecture provided in an embodiment of the present application.

As shown in FIG. 1, the traditional general CPU and the security CPU are equipped with UART (serial port) on both sides, and the two communicate through the serial port, this serial communication method has slow speed and low data exchange efficiency; the traditional general CPU and security CPU are equipped with storage modules (flash storage) on both sides, which will lead to an increase in the cost of the dual CPU system of the POS machine. Therefore, in the actual project, due to cost considerations for the dual CPU architecture of the POS machine, the security CPU without serial communication pins and no memory module may be selected. However, traditional serial communication technology is no longer suitable for communication between the security CPU without storage modules and general CPU, and a new communication method is urgently needed to ensure communication interaction between the dual CPUs.

Based on the problems existing in the existing technology, the embodiment of the present application provides a communication method for dual CPUs in a POS machine, system and medium, the present application adopts remote file system, and realizes the security CPU access operation to the general CPU by communicating and interacting between the client of the remote file system and the server of the remote file system. In the case where the security CPU has no storage capacity, the security CPU can share the storage module on the general CPU side, compared to the existing dual CPUs which both have storage modules, the present application saves the system cost of the dual CPUs; and compared to the existing serial communication method of the dual CPUs, the communication method of the present application speeds up the communication rate and improves the data interaction efficiency.

Figure 2:
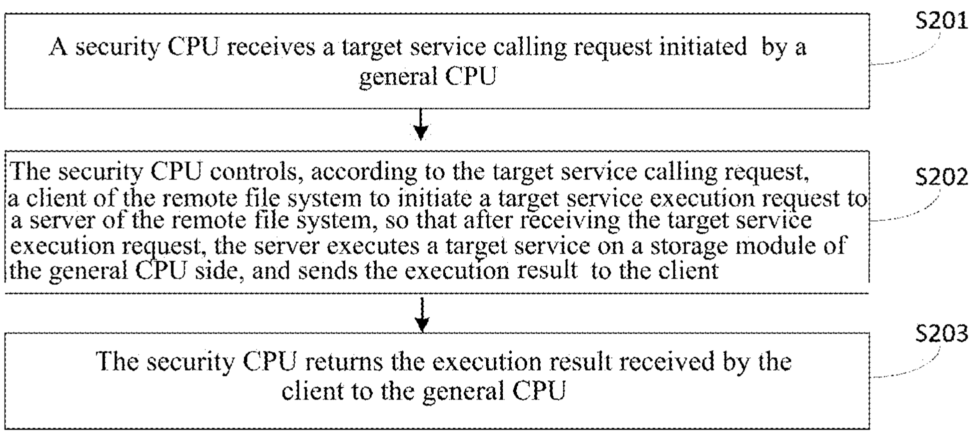
FIG. 2 is a flowchart of a communication method for dual CPUs in a POS machine of an embodiment of the present application.

As shown in FIG. 2, the first aspect of the embodiment of the present application provides a communication method for dual CPUs in a POS machine, including the following steps:

At step S201, a security CPU receives a target service calling request initiated by a general CPU.

After the POS is powered on, the security CPU sends network messages to the general CPU, the security CPU connects to the general CPU to facilitate subsequent service execution, and the network transmission methods of the security CPU and the general CPU include but are not limited to IPC protocol transmission. Since the security CPU involves payment security services related to important data, in actual payment operations, the general CPU requests the security CPU to perform the corresponding payment service function, and the security CPU will access the corresponding service data, however, since there is no storage module on the security CPU side, therefore, the embodiment of the present application adopts a method in which the security CPU and the general CPU share a storage module, so that the service data of the security CPU may be stored in the storage module on the general CPU side, and the security CPU reads and writes files through the storage module on the general CPU side, thereby achieving the same effect as local operations on the security CPU.

Figure 3:
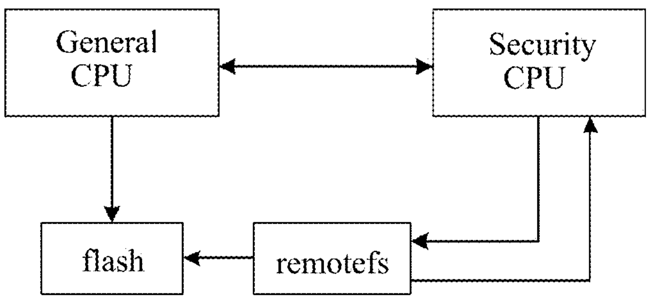
FIG. 3 is a schematic diagram of a dual CPU communication architecture of an embodiment of the present application.

As shown in FIG. 3, the embodiment of the present application invented a new communication architecture for dual CPUs in a POS machine, and the architecture mainly includes a general CPU, a security CPU, a client of a remote file system and a server of the remote file system. The client of the remote file system is deployed in the security CPU, and the server of the remote file system is deployed in the general CPU. The general CPU and the security CPU are connected for transmission based on the remote processor messaging (RPMsg, a virtio based messaging bus that allows kernel drivers to communicate with remote processors available on the system) protocol, and the server of the remote file system and the client of the remote file system are connected for transmission based on the RPMSg protocol. In the master-slave structure of heterogeneous multi-processing systems, the master-slave system communicates through inter processor communication (IPC), and RPMsg is one of IPC. For non-general operating systems, it is likely that they are not equipped with the traditional TCP/IP protocol stack. Therefore, when the general CPU wants to call services on the security CPU through RPC, it cannot use the general RPC framework. network communication method, so the present application uses RPMsg, a communication protocol specifically used for inter-core communication.

Based on the communication architecture of dual CPUs in POS machines, the communication method of dual CPUs in POS machines is explained step by step. In step S201, when the general CPU requests the security CPU to perform the corresponding payment service function, the general CPU will initiate a target service calling request to the security CPU, the security CPU receives the target service calling request and triggers itself to access the service data corresponding to the payment service function, that is, it executes the target service on the storage module on the general CPU side and completes the corresponding payment service function of the POS machine. It should be noted that the payment service function in the embodiment of the present application refers to the payment behavior in the actual payment operation, and the target service refers to the security CPU performing the corresponding target service on the storage module on the general CPU side.

At step S202, the security CPU controls, according to the target service calling request, a client of the remote file system to initiate a target service execution request to a server of the remote file system, so that after receiving the target service execution request, the server can execute a target service on a storage module of the general CPU side, and send the execution result to the client.

At step S203, the security CPU returns the execution result received by the client of the remote file system to the general CPU.

In steps S202 and S203, the overall process of the communication method of dual CPUs in the POS machine is: when the security CPU receives the target service calling request initiated by the general CPU, the security CPU controls the client of the remote file system to initiate a target service execution request to the server according to the target service calling request; after the server receives the target service execution request, it executes the target service to the storage module on the general CPU side and returns the execution result to the client; the client sends the received execution result to the security CPU; the security CPU returns the execution result to the general CPU.

As a preferred implementation of the embodiment of the present application, step S202 specifically includes: controlling the client of the remote file system to send the operation interface information corresponding to the target service to the server of the remote file system, so that after receiving the operation interface information, the server of the remote file system executes the target service on the storage module on the general CPU side.

Furthermore, the operation interface information includes an operation interface ID, after receiving the operation interface information, the server of the remote file system executes the target service on the storage module on the general CPU side, which includes: after receiving the operation interface information, the server of the remote file system calls the corresponding operation interface according to the operation interface ID to execute the target service on the storage module on the general CPU side.

Furthermore, the calling the corresponding operation interface according to the operation interface ID to execute the target service on the storage module on the general CPU side includes: determining, according to the operation interface ID, whether or not an operation interface corresponding to the operation interface ID exists on the server of the remote file system; if yes, call the operation interface corresponding to the operation interface ID to execute the target service on the storage module on the general CPU side; if not, return an execution error result to the client of the remote file.

As a preferred implementation of the embodiment of the present application, before the client of the remote file system initiates a target service execution request to the server of the remote file system, further including: encoding the target service execution request based on the RPMsg protocol; after the server of the remote file receives the target service execution request, further including: decoding the target service execution request based on the RPMsg protocol; before sending the execution result to the client of the remote file system, further including: encoding the execution result based on the RPMSg protocol; after the client of the remote file system receives the execution result, further including: decoding the execution result based on the RPMsg protocol.

Figures 4, 5:
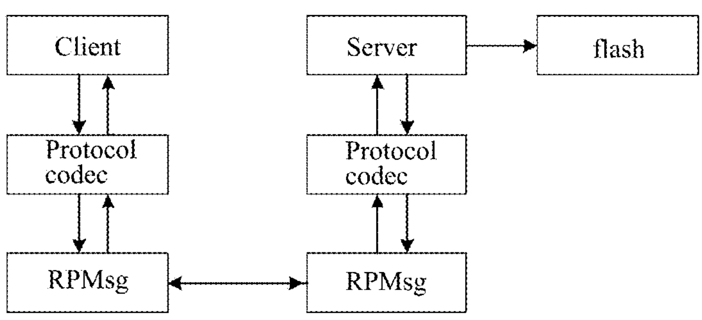
FIG. 4 is an architecture schematic diagram of a remote file system of an embodiment of the present application.
FIG. 5 is a flowchart of file system mounting of an embodiment of the present application.

Combined with the above communication method, the architecture and principles of the remote file system are explained. FIG. 4 shows the architecture diagram of the remote file system, both the client and the server of the remote file system have protocol codecs and can encode and decode RPMSg protocol format transmission. On the client of the remote file system: when the security CPU receives the target service calling request initiated by the general CPU, the security CPU runs the client of the remote file system, the protocol codec on the client assembles and encodes the operation interface information (operation interface ID, parameters, etc.) corresponding to the target service into a message that may be transmitted in the RPMsg protocol format, and sends it to the server of the remote file system.

On the server of the remote file system: the general CPU runs the server of the remote file system, the protocol codec on the server receives the message transmitted in the RPMsg protocol format sent by the client, and decodes it to obtain the operation interface information, and then searches for the corresponding operation interface on the server of the remote file system according to the operation interface ID in the operation interface information, if a corresponding operation interface exists, the local service is called to execute the target service on the storage module on the general CPU side, and the execution result is returned to the protocol codec on the server, the execution result is encoded and sent to the client; if there is no corresponding operation interface, the execution error result is returned to the protocol codec of the server, which encodes it and returns the execution error result to the client.

The present application can achieve that the security CPU and the general CPU share a storage module by means of a remote file system mechanism, and the security CPU execute the target services on the storage module on the general CPU side through the client and the server of the remote file system, wherein the target services may be operations such as mounting and dismounting of a file system, creation and deletion of a directory, and creation, reading, and writing of a file. Exemplarily, the embodiments of the present application select two target services, namely, the mounting process of a file system and the file reading and writing process of a file system, in conjunction with the communication method described above, for specific illustration:

FIG. 5 shows a flowchart of file system mounting, the client of the remote file system calls the operation interface of the file system mount, encodes the operation interface ID, parameters, and other operation interface information related to the operation interface, and sends it to the server of the remote file system based on the RPMSg protocol; the server receives and decodes the operation interface information, and searches for the operation interface corresponding to the file system mount according to the operation interface ID, if there is an operation interface corresponding to the file system mount, then call the operation interface of the file system mount to execute the file system mounting operation on the storage module on the general CPU side, encode the execution result based on the RPMsg protocol and return it to the client of the remote file system, (if there is no operation interface corresponding to the file system mount, then encode the execution error result based on the RPMsg protocol and return it to the client of the remote file system); the client receives the execution result (or the execution error result) and completes the file system mounting operation.

Figure 6:
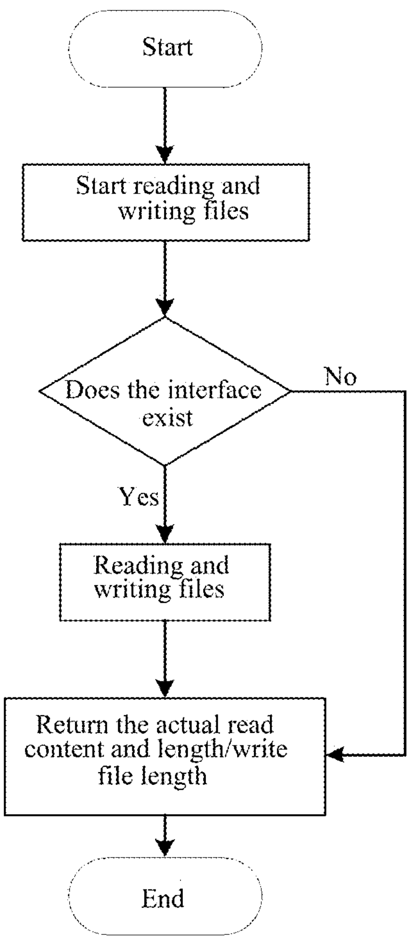
FIG. 6 is a flowchart of file reading and writing operations of an embodiment of the present application.

FIG. 6 shows the flowchart of file reading and writing, the client of the remote file system calls the operation interface of file reading and writing, encodes the operation interface ID, parameters, and other operation interface information related to the operation interface, and sends it to the server of the remote file system based on the RPMSg protocol; the server receives and decodes the operation interface information, and searches for the operation interface corresponding to the file reading and writing according to the operation interface ID, if there is an operation interface corresponding to the file reading and writing, then call the operation interface of the file reading and writing to execute file read and write operation on the storage module on the general CPU side, encode the execution result (actual read content and length or written file length) based on the RPMsg protocol and return it to the client of the remote file system, (if there is no operation interface corresponding to the file reading and writing, then encode the execution error result based on the RPMsg protocol and return it to the client of the remote file system); the client receives the execution result (or the execution error result) and completes the file read and write operation, and returns the execution result to the general CPU through the security CPU.

In addition, the remote file system of the embodiments of the present application provides the following basic functions (equivalent to the target services) including:

access: whether the access file exists;
open: open the file;
write: write file;
read: read file;
close: close the file;
lseek: find the specified location;
mkdir: create directory;
opendir: open a directory;
readdir: read directory;
closedir: close the directory;
mount: mount the file system;
unlink: delete the file directory entry and reduce its number of connections;
stat: obtain file information;
truncate: modify the file size;
rename: file rename;
statvfs: obtain file system statistics.

In addition, the protocol content of the remote file system based on the RPMsg protocol transmission includes the request message initiated by the client and the answer message returned by the server, specifically, the protocol content of the request message is shown in Table 1 and the protocol content of the answer message is shown in Table 2:

TABLE 1

| message | field name | type | length | descriptions |
|---|---|---|---|---|
| packet head | TYPE_PKT_SIZE | char | 1 | identification of packet head |
| | TYPE_INT_16 | char | 1 | the next two bytes of data |
| | packet length 1 | char | 1 | the lower 8 bits of the packet length |
| | packet length 2 | char | 1 | the higher 8 bits of the packet length |

TABLE 1-continued

| message | field name | type | length | descriptions |
|---|---|---|---|---|
| packet body | TYPE_START | char | 1 | type start identification |
| | TYPE_INT_32 | char | 1 | next is 4 bytes of data |
| | PACKET_SIG | char | 1 | the lower 8 bits of the packet identification |
| | PACKET_SIG >> 8 | char | 1 | the second byte of the packet identification |
| | PACKET_SIG >> 16 | char | 1 | the third byte of the packet identification |
| | PACKET_SIG >> 24 | char | 1 | the higher 8 bits of the packet identification |
| | TYPE_OP_ID | char | 1 | operation symbol identification |
| | request operator | char | 1 | file/directory operation types |
| | specific parameters | indefinite | indefinite | 1. open operation: strlen(filename)\|filename\|flags\|mode; 2. read operation: fd\|readcount; |
| | TYPE_END | char | 1 | packet end identification |
| | TYPE_INT_32 | char | 1 | next is 4 bytes of shaping |
| | ~PACKET_SIG | char | 1 | reverse the lower 8 bytes of the packet identification |
| | ~PACKET_SIG >> 8 | char | 1 | reverse the second byte of the packet identification |
| | ~PACKET_SIG >> 16 | char | 1 | reverse the third byte of the packet identification |
| | ~PACKET_SIG >> 24 | char | 1 | reverse the higher 8 bits of the packet identification |

TABLE 2

| message | field name | type | length | descriptions |
|---|---|---|---|---|
| packet head | TYPE_PKT_SIZE | char | 1 | identification of packet head |
| | TYPE_INT_16 | char | 1 | the next two bytes of data |
| | packet length 1 | char | 1 | the lower 8 bits of the packet length |
| | packet length 2 | char | 1 | the higher 8 bits of the packet length |
| packet body | TYPE_START | char | 1 | type start identification |
| | TYPE_INT_32 | char | 1 | next is 4 bytes of data |
| | PACKET_SIG | char | 1 | the lower 8 bits of the packet identification |
| | PACKET_SIG >> 8 | char | 1 | the second byte of the packet identification |
| | PACKET_SIG >> 16 | char | 1 | the third byte of the packet identification |
| | PACKET_SIG >> 24 | char | 1 | the higher 8 bits of the packet identification |
| | request operator\|0X80 | char | 1 | response operator |
| | parameter type | char | 1 | return result code type |
| | specific result | indefinite | indefinite | 1. open operation: result\|result >> 8\| result >> 16\| result >> 24; 2. read operation: strlen(content)\|content; |
| | TYPE_END | char | 1 | packet end identification |
| | TYPE_INT_32 | char | 1 | next is 4 bytes of shaping |
| | ~PACKET_SIG | char | 1 | reverse the lower 8 bytes of the packet identification |
| | ~PACKET_SIG >> 8 | char | 1 | reverse the second byte of the packet identification |
| | ~PACKET_SIG >> 16 | char | 1 | reverse the third byte of the packet identification |
| | ~PACKET_SIG >> 24 | char | 1 | reverse the higher 8 bits of the packet identification |

It should be understood that the magnitude of the serial numbers of the steps in the above embodiments does not imply the order of execution, and the order of execution of the processes should be determined by their functions and internal logic, without constituting any limitation of the process of implementing the embodiments of the present application.

Figure 7:
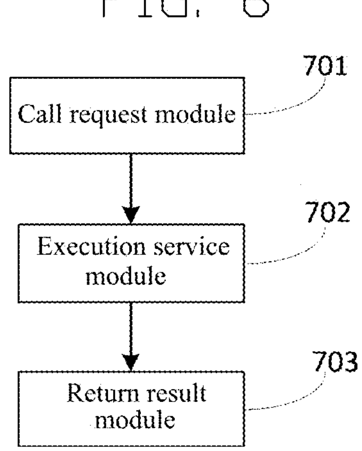
FIG. 7 is a schematic diagram of a communication apparatus for dual CPUs in a POS machine of an embodiment of the present application.

As shown in FIG. 7, a second aspect of an embodiment of the present application provides a communication apparatus for dual CPUs in a POS machine, including:

A call request module 701 is used for the security CPU to receive a target service calling request initiated by the general purpose CPU;

An execution service module 702 is used for the security CPU to control the client of the remote file system to initiate a target service execution request to the server of the remote file system according to the target service calling request, so that after receiving the target service execution request, the server can execute a target service on a storage module of the general CPU side, and send the execution result to the client of the remote file system;

A return result module 703 is used for the security CPU to return the execution result received by the client of the remote file system to the general CPU.

As a preferred implementation of the embodiment of the present application, in the execution service module 702, the controlling the client of the remote file system to initiate a target service execution request to the server of the remote file system according to the target service calling request, so that after receiving the target service execution request, the server executes a target service on a storage module of the general CPU side includes: controlling the client of the remote file system to send the operation interface information corresponding to the target service to the server of the remote file system, so that after receiving the operation interface information, the server of the remote file system executes the target service on the storage module on the general CPU side.

As a preferred implementation of the embodiment of the present application, the operation interface information includes an operation interface ID, after receiving the operation interface information, the server of the remote file system executes the target service on the storage module on the general CPU side includes: after receiving the operation interface information, the server of the remote file system calls the corresponding operation interface according to the operation interface ID to execute the target service on the storage module on the general CPU side.

As a preferred implementation of the embodiment of the present application, the calling the corresponding operation interface according to the operation interface ID to execute the target service on the storage module on the general CPU side includes: determining, according to the operation interface ID, whether or not an operation interface corresponding to the operation interface ID exists on the server of the remote file system; if yes, call the operation interface corresponding to the operation interface ID to execute the target service on the storage module on the general CPU side; if not, return an execution error result to the client of the remote file.

As a preferred implementation of the embodiment of the present application, before the client of the remote file system initiates a target service execution request to the server of the remote file system, further including: encoding the target service execution request based on the RPMsg protocol; after the server of the remote file receives the target service execution request, further including: decoding the target service execution request based on the RPMsg protocol; before sending the execution result to the client of the remote file system, further including: encoding the execution result based on the RPMSg protocol; after the client of the remote file system receives the execution result, further including: decoding the execution result based on the RPMsg protocol.

It may be understood that the communication apparatus for dual CPUs in a POS machine provided in the second aspect of the embodiment of the present application is a modular device based on the communication method of dual CPUs in a POS machine provided by the first aspect, and the specific principles may be referred to in the content of the method embodiments described in the first aspect.

Figure 8:
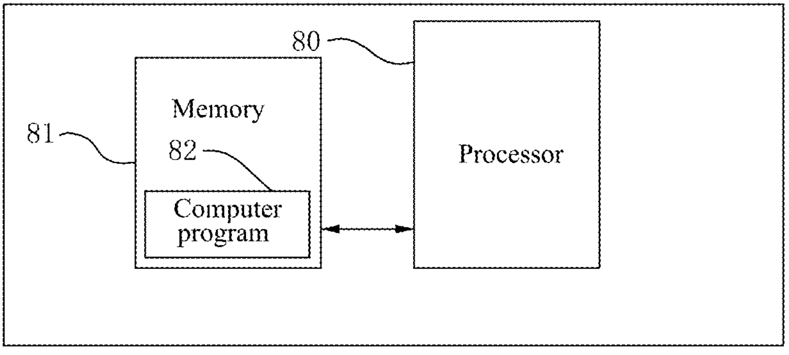
FIG. 8 is a schematic diagram of a communication system of an embodiment of the present application.

As shown in FIG. 8, a third aspect of the embodiment of the present application provides a communication system, the communication system includes a memory 81, a processor 80, and a computer program 82 stored in the memory 81 and runnable in the processor 80, the computer program 82 is executed by the processor 80 to implement the steps of the method described in any one of the first aspect. Alternatively, the computer program 82 is executed by the processor 80 to implement the functions of each module in the above device embodiments.

A fourth aspect of embodiments of the present application provides a computer readable storage medium, the computer readable storage medium stores a computer program, the computer program is executed by a processor to implement the steps of the method described in any one of the first aspect.

Those skilled in the art can clearly understand that for the convenience and simplicity of description, only the division of the above functional units and modules is used as an example. In actual applications, the above functions may be assigned to different functional units or modules as needed, the internal structure of the device may be divided into different functional units or modules to complete all or part of the functions described above. The functional units and modules in the embodiments may be integrated in a single processing unit, or the individual units may physically exist separately, or two or more units may be integrated in a single unit, and the above integrated units may be implemented either in the form of hardware or in the form of software functional units. In addition, the specific names of each functional unit and module are only for the purpose of distinguishing them from each other and are not intended to limit the scope of protection of the present application. The specific working process of the units and modules in the above system can refer to the corresponding process in the previous method implementation examples, and will not be repeated here.

In the above embodiments, each embodiment is described with its own emphasis, for parts that are not detailed or documented in a certain embodiment, please refer to the relevant descriptions of other embodiments.

Those of ordinary skill in the art will appreciate that the units and algorithm steps of each example described in conjunction with the embodiments disclosed herein may be implemented with electronic hardware, or a combination of computer software and electronic hardware. Whether these functions are performed in hardware or software depends on the specific application and design constraints of the technical solution. The skilled artisans may implement the described functionality using different methods for each specific application, but such implementations should not be considered beyond the scope of the present application.

In the embodiments of the present application, it should be understood that the apparatus/terminal device and method disclosed, may be implemented in other ways. For example, the apparatus/terminal device embodiments described above are merely schematic, for example, the division of the modules or units is merely a logical functional division, and the actual implementation may be divided in another way, for example, a plurality of units or components may be combined or may be integrated into another system, or some features may be ignored or may not be implemented. Another point is that the mutual coupling or direct coupling or communication connection shown or discussed may be an indirect coupling or communication connection through some interface, device or unit, which may be electrical, mechanical or otherwise.

The units described as separate components may or may not be physically separated, and the components shown as units may or may not be physical units, they may be located in one place, or they may be distributed to multiple network units. Some or all of the units may be selected according to actual needs to achieve the purpose of the solution of the embodiment of the present application.

In addition, the functional units in various embodiments of the present application may be integrated in a single processing unit, or each unit may physically exist separately, or two or more units may be integrated in a single unit. The above integrated units may be implemented either in the form of hardware or in the form of software functional units.

The integrated module/unit may be stored in a computer readable storage medium if implemented as a software functional unit and sold or used as a stand-alone product. Based on this understanding, the present application can implement all or part of the processes in the methods of the above embodiments, and can also be completed by using computer program instructions related to hardware, the computer program may be stored in a computer readable storage medium, when the computer program is executed by a processor, the steps of each of the above method embodiments may be implemented. The computer program includes computer program code, which may be in the form of source code, object code, executable file or some intermediate form. The computer-readable medium may include: any entity or device capable of carrying the computer program code, recording media, U disk, mobile hard disk, magnetic disks, optical disks, computer memory, read-only memory (ROM), random access memory (RAM), electrical carrier signals, telecommunications signals, and software distribution media, etc. It should be noted that the content contained in the computer-readable medium may be appropriately added or deleted according to the requirements of legislation and patent practice in the jurisdiction, for example, in some jurisdictions, according to legislation and patent practice, the computer-readable medium do not include electrical carrier signals and telecommunications signals.

The above described embodiments are only used to illustrate the technical solutions of the present application, and not to limit them; although the present application has been described in detail with reference to the above described embodiments, those of ordinary skill in the art should understand that they can still make modifications to the technical solutions recorded in the above described embodiments, or make equivalent substitutions for some of the technical features therein; and such modifications or substitutions do not make the essence of the corresponding technical solutions depart from the spirit and scope of the technical solutions of the various embodiments of the present application. These modifications or substitutions do not detach the essence of the corresponding technical solutions from the spirit and scope of the technical solutions of the embodiments of the present application and shall be included in the scope of protection of the present application.

The invention claimed is:

1. A communication method for dual CPUs in a POS machine, wherein the communication method comprises:

a security CPU receives a target service calling request initiated by a general CPU;

the security CPU controls, according to the target service calling request, a client of a remote file system to initiate a target service execution request to a server of the remote file system, so that after receiving the target service execution request, the server executes a target service on a storage module of a general CPU side, and sends the execution result to the client of the remote file system; and the security CPU returns the execution result received by the client of the remote file system to the general CPU.

2. The communication method for dual CPUs in the POS machine according to claim 1, wherein controlling the client of the remote file system to initiate the target service execution request to the server of the remote file system, so that after receiving the target service execution request, the server executes the target service on the storage module of the general CPU side, comprises:

controlling the client of the remote file system to send an operation interface information corresponding to the target service to the server of the remote file system, so that after receiving the operation interface information, the server of the remote file system executes the target service on the storage module on the general CPU side.

3. The communication method for dual CPUs in the POS machine according to claim 2, wherein the operation interface information comprises an operation interface ID, after receiving the operation interface information, the server of the remote file system executes the target service on the storage module on the general CPU side, comprises:

after receiving the operation interface information, the server of the remote file system calls a corresponding operation interface according to the operation interface ID to execute the target service on the storage module on the general CPU side.

4. The communication method for dual CPUs in the POS machine according to claim 3, wherein calling the corresponding operation interface according to the operation interface ID to execute the target service on the storage module on the general CPU side, comprises:

determining, according to the operation interface ID, whether or not an operation interface corresponding to the operation interface ID exists on the server of the remote file system;

if yes, calling the operation interface corresponding to the operation interface ID to execute the target service on the storage module on the general CPU side; if not, returning an execution error result to the client of the remote file.

5. The communication method for dual CPUs in the POS machine according to claim 1, wherein before the client of the remote file system initiates a target service execution request to the server of the remote file system, further comprises: encoding the target service execution request based on the RPMsg protocol;

after the server of the remote file receives the target service execution request, further comprises:

decoding the target service execution request based on the RPMsg protocol;

before sending the execution result to the client of the remote file system, further comprises:

encoding the execution result based on the RPMSg protocol; and after the client of the remote file system receives the execution result, further comprises: decoding the execution result based on the RPMsg protocol.

6. A communication system comprising a memory, a processor and a computer program stored in the memory and runnable on the processor, wherein the processor executes the computer program to implement the communication method as claimed in claim 1.

7. A computer readable storage medium, the computer readable storage medium storing a computer program, wherein the processor executes the computer program to implement the communication method as claimed in claim 1.

8. The communication system according to claim 6, wherein controlling the client of the remote file system to initiate the target service execution request to the server of the remote file system, so that after receiving the target service execution request, the server executes the target service on the storage module of the general CPU side, comprises:

controlling the client of the remote file system to send an operation interface information corresponding to the target service to the server of the remote file system, so that after receiving the operation interface information, the server of the remote file system executes the target service on the storage module on the general CPU side.

9. The communication system according to claim 8, wherein the operation interface information comprises an operation interface ID, after receiving the operation interface information, the server of the remote file system executes the target service on the storage module on the general CPU side, comprises:

after receiving the operation interface information, the server of the remote file system calls a corresponding operation interface according to the operation interface ID to execute the target service on the storage module on the general CPU side.

10. The communication system according to claim 9, wherein calling the corresponding operation interface according to the operation interface ID to execute the target service on the storage module on the general CPU side, comprises:

determining, according to the operation interface ID, whether or not an operation interface corresponding to the operation interface ID exists on the server of the remote file system;

if yes, calling the operation interface corresponding to the operation interface ID to execute the target service on the storage module on the general CPU side; if not, returning an execution error result to the client of the remote file.

11. The communication system according to claim 6, wherein before the client of the remote file system initiates a target service execution request to the server of the remote file system, further comprises: encoding the target service execution request based on the RPMsg protocol;

after the server of the remote file receives the target service execution request, further comprises:

decoding the target service execution request based on the RPMsg protocol;

before sending the execution result to the client of the remote file system, further comprises:

encoding the execution result based on the RPMSg protocol; and after the client of the remote file system receives the execution result, further comprises: decoding the execution result based on the RPMsg protocol.

12. The computer readable storage medium according to claim 7, wherein controlling the client of the remote file system to initiate the target service execution request to the server of the remote file system, so that after receiving the target service execution request, the server executes the target service on the storage module of the general CPU side, comprises:

controlling the client of the remote file system to send an operation interface information corresponding to the target service to the server of the remote file system, so that after receiving the operation interface information, the server of the remote file system executes the target service on the storage module on the general CPU side.

13. The computer readable storage medium according to claim 12, wherein the operation interface information comprises an operation interface ID, after receiving the operation interface information, the server of the remote file system executes the target service on the storage module on the general CPU side, comprises:

after receiving the operation interface information, the server of the remote file system calls a corresponding operation interface according to the operation interface ID to execute the target service on the storage module on the general CPU side.

14. The computer readable storage medium according to claim 13, wherein calling the corresponding operation interface according to the operation interface ID to execute the target service on the storage module on the general CPU side, comprises:

determining, according to the operation interface ID, whether or not an operation interface corresponding to the operation interface ID exists on the server of the remote file system;

if yes, calling the operation interface corresponding to the operation interface ID to execute the target service on the storage module on the general CPU side; if not, returning an execution error result to the client of the remote file.

15. The computer readable storage medium according to claim 7, wherein before the client of the remote file system initiates a target service execution request to the server of the remote file system, further comprises: encoding the target service execution request based on the RPMsg protocol;

after the server of the remote file receives the target service execution request, further comprises:

decoding the target service execution request based on the RPMsg protocol;

before sending the execution result to the client of the remote file system, further comprises:

encoding the execution result based on the RPMSg protocol; and after the client of the remote file system receives the execution result, further comprises: decoding the execution result based on the RPMsg protocol.

* * * * *